3,157,605
PROCESS FOR PURIFYING OMEGA-HYDROPERFLUOROALKANOLS

Charles Depew Ver Nooy III, Newark, Del., assignor to E. I. du Pont de Nemours and Company, Wilmington, Del., a corporation of Delaware
No Drawing. Filed Aug. 18, 1960, Ser. No. 50,325
3 Claims. (Cl. 260—633)

This invention is directed to a new process for purifying omega-hydroperfluoroalkanols made by the telomerization of tetrafluoroethylene and methanol according to the method disclosed in Examples 1 to 4 of U.S. Patent 2,559,628. These alpha,alpha,omega-trihydroperfluoroalkanols to which the process of this invention is applicable, have the general structure $H(CF_2CF_2)_n \cdot CH_2OH$ wherein $n$ is a positive integer within the range of 2 to 10.

These primary alcohols are now known to contain minor portions (usually 5–10% by weight) of secondary fluoroalcohols of the general structure

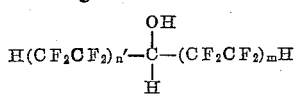

wherein $n'$ and $m$ are integers from 1 to 5. The present invention provides a direct and very economical process for removing these by-products from the primary fluoroalcohols by taking advantage of a newly discovered chemical reaction which quite unexpectedly was found to be highly selective for the secondary fluoroalcohols, leaving the primary alcohols essentially intact.

The secondary fluoroalcohols are useful for the synthesis of some valuable end-products, and it was found that their presence as by-products in the primary fluoroalcohols is not objectionable in some of the commercial uses developed for these technical telomers. There is, however, an urgent need for employing, in other uses, the primary fluoroalcohols in their highest obtainable state of purity, that is, essentially free of secondary fluoroalcohols which impart undesirable properties to certain end-products of potential commercial interest.

It is not possible, at the present status of the art, to avoid the formation of these by-products in the telomerization process according to U.S. 2,559,628 because the major reaction product $H(CF_2CH_2)_n \cdot CH_2OH$ behaves as a primary alcohol telogen, thereby producing unavoidably a minor portion of the bis(omega-hydroperfluoroalkyl)-carbinols. The primary and secondary fluoroalcohols containing essentially the same number of carbon atoms boil in practically the same temperature range. This makes it impossible to separate them by any known physical separation process, except in gas chromatography analysis.

The problem confronting the inventor was, therefore, to discover a chemical reaction to which only the relatively small amounts of secondary fluoroalcohols present in the original mixture would respond, without changing chemically the major (approximately 90%) primary alcohol component of the mixture.

The prior art does not disclose or suggest a process for chemically reacting a secondary fluorinated (or unfluorinated) alcohol with any reagent which would not also react with the corresponding primary alcohol if it were present in the same reaction mixture. In fact, the hydroxyl in primary aliphatic alcohols would be expected to be, under comparable conditions, more highly reactive as compared with the hydroxyl in secondary alcohols where the additional alkyl attached to the same carbon atom which bears the hydroxy group can prevent or retard its reaction by steric hindrance. Most modern textbooks on organic chemistry discuss, in contrast to the present invention, the well-known differences in chemical reactivity and stability that exist between tertiary alcohols on the one hand and primary and secondary alcohols of the same number of carbons and of otherwise comparable structures.

It is well known that, in general, secondary alcohols give on oxidation the corresponding ketones, while the primary alcohols are oxidized to the aldehydes or acids.

In 1909 Guerbet (Compt. rend., 149, 129) reported that on treatment with sodium alkoxide under very drastic conditions (heating at 195–200° C. for 24 hours), secondary alcohols can suffer "deepseated destruction, reminiscent of the oxidative splitting of the corresponding ketone." Thus, isopropanol gave a mixture of isovaleric, acetic, and formic acid, while sec.-butanol gave propionic and formic acids.

In their textbook on "Synthetic Organic Chemistry" Wagner and Zook mentioned on page 32 that "fission of the carbon chain sometimes occurs during dehydration," according to the following specifically cited reaction:

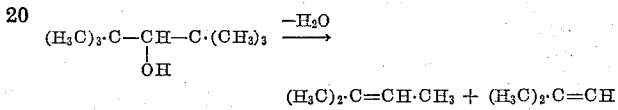

Instead of splitting the carbon chain, treatment of a secondary alcohol with fused alkalies can in some cases result in combining two molecules together with formation of an alcohol of a much longer carbon chain. Thus Whitmore points out in his textbook "Organic Chemistry," on page 122 of the 1937 edition, that butanol-2 gave with fused alkalies "di-sec-butyl alcohol" (5-methylheptanol-3), because "a hydrogen of the methyl group reacted rather than one from the alpha methylene group."

More specifically, the present invention is directed to a process for reducing the bis-(omega-hydroperfluoroalkyl)-carbinol content of mixtures containing said bis-carbinols and omega-hydroperfluoroalkylcarbinols, which process comprises heating said mixture with an excess of a caustic alkali. A preferred embodiment is one in which the secondary fluoroalcohol corresponds to the general formula

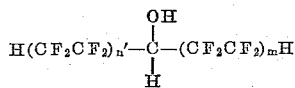

in which $n'$ and $m$ are integers from 1 to 5, and in which the primary fluoroalcohol corresponds to the general formula

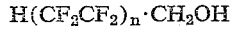

in which $n$ is a positive integer within the range of 2 to 10, said process being further characterizsed by heating the original mixture with an excess of sodium hydroxide or potassium hydroxide, preferably used in the form of their aqueous solutions of a concentration of from 10 to 30 parts NaOH or KOH in 100 parts of water and at a sufficiently high temperature and for a sufficiently long time to convert substantially all of the secondary alcohols present to lower molecular weight fragments, said excess of the caustic alkali being at least so large that, after completion of the reaction, the aqueous layer still shows strong caustic alkalinity.

Another embodiment of the present invention is the heretofore-described process in which the original mixture consists of one of the distillation cuts containing predominantly the $C_7$ or the $C_9$ fluoroalcohols made by the telomerization of tetrafluoroethylene and methanol according to the process disclosed in U.S. 2,559,628, and in which the caustic alkali treatment is carried out by heating the mixture with a solution containing approximately 10 parts of potassium hydroxide per 100 parts of the fluoroalcohol mixture for at least several hours at a temperature within the range of from 80 to 160° C.

A still further embodiment is one in which substantially all the reaction products which are newly formed during the treatment with caustic alkalies are removed after completion of the reaction by separating the aqueous layer and washing the oil layer substantially free of electrolytes, and then recovering the purified primary fluoroalcohol by distilling the dried oil layer.

It is therefore an object of the present invention to provide a novel process for purifying omega-hydroperfluoroalkanols made by the telomerization of tetrafluoroethylene and methanol. It is a further object of this invention to provide a process for removing secondary fluoroalkanols, present in minor proportions, from primary alcohols without chemically changing said primary alcohols.

A further object of this invention is to provide a novel process for removing secondary fluoroalcohol by-products from primary fluoroalcohols by utilizing a newly discovered chemical reaction which has been found, unexpectedly, to be highly selective for secondary fluoroalcohols while leaving the primary alcohols essentially intact.

These and other objects will become apparent in the following description and claims.

This invention is based on the unexpected and surprising discovery that a treatment with strong caustic alkalies at elevated temperatures splits the carbon chain in the pertinent secondary fluoroalcohols with formation of relatively low boiling fluorohydrocarbons and water-soluble fragments, while the same treatment does not change the corresponding primary fluoroalcohols. This profound difference in their behavior towards hot, aqueous KOH or NaOH makes it possible to separate in the pertinent mixtures the secondary from the primary fluoroalcohols by subjecting the mixture to this very simple chemical treatment, followed by a fractional distillation. The fluorohydrocarbon fragments formed which were positively identified by isolating the pure products, have on both ends of their unbranched chain a $HCF_2$— group. The fate of the other part of the molecule (including the carbon bearing the hydroxy group) is not known, except that it seems apparent that substantially all of its fluorine is split off, forming the alkali fluoride in the aqueous solution or in suspension. It is, therefore, essential for the success of the process according to this invention to employ a quantity of the caustic alkali which is at least sufficiently large to combine with all the fluorine ions which are formed. Experience has shown, however, that sufficient caustic alkali must be used to have a distinct excess of KOH or NaOH left in the aqueous phase after the reaction is completed, since near the neutral point the splitting reaction will cease. Not knowing a priori which one of the two fluorocarbon chains which are linked in unsymmetrical secondary fluoroalcohols by the

group is split off as the corresponding fluorohydrocarbon, and which one decomposes into essentially unfluorinated fragments of unknown structures, it is impossible to calculate from the start accurately the required quantity of the caustic alkali to be employed. A safe and recommended rule, therefore, is to use an amount sufficient to neutralize completely the fluorine ions which theoretically would be formed if all the fluorine in the secondary fluoroalcohol were split off as HF. This leaves in all cases a safe margin of excess caustic alkali, sufficient to assure completion of the desired reaction. Experience has shown that the use of 10 parts of KOH or NaOH per 100 parts of the original telomerization mixtures is in all cases adequate, and this constitutes the preferred embodiment of this invention. Much larger amounts of caustic alkalies may, of course, be employed from the start or added at any stage during the reaction, but excessively large amounts are unnecessary and wasteful.

The amount of water present in the reaction mixture is not critical. As is illustrated in the examples, the initial KOH concentration is preferably in the range of from 15–25%. Under these conditions the potassium fluoride formed remains soluble in the final aqueous phase, which facilitates its removal. Sodium fluoride is considerably less soluble in water (approximately 0.3 part in 100 parts); it precipitates at high concentrations out of solution and must then be removed by filtration from the aqueous phase unless an uneconomically large amount of water is employed. Potassium hydroxide is, therefore, the preferred caustic alkali in the process according to this invention.

The temperature is not critical within the range of not lower than about 80° C. and not higher than approximately 160° C. At a temperature lower than 80° C. the reaction proceeds too slowly to be practical, and at temperatures above 160° C. the pressure in this aqueous system is excessively high, and there is a definite possibility that at excessively high temperatures the primary fluoroalcohols may be partly decomposed or some of its chlorine split off, thus defeating the purpose of this invention. It was most unexpected, however, that after a treatment with a very large excess of the caustic alkali at a temperature as high as 150° C., held for 5 hours, practically all (95%) of the primary fluoroalcohol originally present was recovered as a chemically pure product.

The time required for the treatment to be effective depends primarily on the temperature employed. It is not definitely known what the shortest effective reaction time is. In the representative examples employing 90±2° C. as the reaction temperature, about 20 hours were usually employed to assure completion of the reaction in an initial concentration of about 16% potassium hydroxide, while at 150° C. under pressure the reaction was completed in less than 5 hours with an initial concentration of 22.5% of sodium hydroxide. The choice of the caustic alkali (KOH or NaOH), and its concentration (as long as a large excess is employed) do not appear to influence very significantly the speed of the reaction.

The composition of the starting material, and the purity of the final, distilled product are determined most reliably by vapor phase chromatographic analysis.

Any reaction vessel or, if called for, an autoclave constructed of material resistant to exposure to hot, aqueous caustic alkalies, and equipped with an efficient agitator, are suitable for carrying out this purification process. In the separation of the aqueous phase from the oily layer, and in the removal of the low boiling fragments from the primary fluoroalcohol, various modifications from the procedures illustrated in the examples may be employed, as will be apparent to those skilled in the art. For instance, instead of separating the layers, the volatile compounds may be distilled directly from the reaction vessel, with or without employing a fractionation column, and, if necessary, the distillate may then be extracted with water to remove water-soluble organic fragments which may not have been removed completely from the primary fluoroalcohol. As another obvious modification, an inert, water-insoluble solvent of a boiling point different from that of the primary fluoroalcohol may be added after completing the reaction in order to facilitate the separation of the oil phase from the aqueous phase.

The present invention is illustrated in the following representative examples wherein quantities are in parts by weight.

*Example 1*

A solution of 50 parts of potassium hydroxide in 150 parts of water was placed in a glass flask fitted with a thermometer, agitator, and exit line leading to a trap cooled with Dry Ice. To this solution was added 500 parts of crude 1,1,7-trihydroperfluoroheptanol in the form of the predominantly $C_7$ cut obtained in the fractional distillation of the mixture of the telomerization products from tetrafluoroethylene and methanol according to the process of U.S. 2,559,628. Vapor phase chromatographic analysis showed this $C_7$ cut to have the composition shown below. The mixture was stirred at $90\pm2°$ C. for 20 hours, allowing the liberated, volatile reaction products to pass to the trap which at the end of the reaction contained a decomposition fragment which boiled at 45° C. and was identified as 1,4-dihydrooctafluorobutane of the structure $$H(CF_2CF_2)_2H$$

After cooling the reaction mixture to room temperature, the brown-colored, aqueous layer (containing the excess potassium hydroxide and the potassium fluoride formed in the reaction) was separated from the pale yellow oil layer which was washed, first with 100 parts and then twice with 250 parts of water. The oil was then dried with magnesium sulfate. Vapor phase chromatographic analysis gave the following comparable data:

COMPOSITION OF CRUDE AND TREATED $C_7$ CUT

| Compounds Present | In Original, percent | After Treatment, percent |
|---|---|---|
| $H(CF_2CF_2)_3 \cdot CH_2OH$ | 93.9 | 99.2 |
| $H(CF_2CF_2)_2-CH-CF_2CF_2H$ 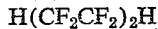 $\quad\quad\quad\quad\quad\; OH$ | 5.6 | none |
| $H(CF_2CF_2)_2 \cdot CH_2OH$ | 0.4 | 0.2 |
| $HCF_2CF_2 \cdot CH_2OH$ | 0.1 | 0.1 |

Distillation of the treated, dried oil gave chemically pure 1,1,7-trihydroperfluoroheptanol, boiling at 130–131° C. under 200 mm. mercury pressure.

*Example 2*

The procedure described in Example 1 was repeated, using in this case a solution of 75 parts of potassium hydroxide in 350 parts of water, and 750 parts of the crude cut of 1,1,7-trihydroperfluoroheptanol obtained from another production lot and having the composition shown below. The treatment was carried out as described in the previous example, except that the treated oil layer was first washed with 300 parts of diluted (5%) sulfuric acid (to facilitate rapid separation of the partly emulsified layer), and then with 300 parts of a 0.5% aqueous solution of potassium sulfate.

The washed oil layer was then distilled continuously through a Barrett receiver for 2 hours in the presence of 25 parts of activated carbon, until the water was completely removed. The dry oil was then filtered, yielding pale yellow colored 1,1,7-trihydroperfluoroheptanol of the following composition, as shown by vapor phase chromatographic analysis:

| Compounds Present | In Original, percent | After Treatment, percent |
|---|---|---|
| $H(CF_2CF_2)_3 \cdot CH_2OH$ | 90.9 | 99.1 |
| $H(CF_2CF_2)_2-CH-CF_2CF_2H$ $\quad\quad\quad\quad\quad\; OH$ | 8.6 | 0.4 |
| $H(CF_2CF_2)_2 \cdot CH_2OH$ | 0.3 | 0.2 |
| $HCF_2CF_2 \cdot CH_2OH$ | 0.2 | 0.2 |

*Example 3*

The procedure described in Examples 1 and 2 was repeated in pilot plant scale equipment, using a solution of 6 lbs. of potassium hydroxide in 30 lbs. of water for the treatment of 60 lbs. of a $C_7$ fluoroalcohol cut of the composition shown below. The treatment was continued for a total of 24 hours at $90\pm2°$ C., and the progress of the reaction was followed by withdrawing test portions after the reaction periods shown below, and by analyzing these test samples by vapor phase chromatography. The results are tabulated below where the compounds found to be present (in the amounts indicated) are shown by self-explanatory symbols. They are listed below in the same order as in the two previous tables:

VAPOR PHASE CHROMATOGRAPHIC ANALYSES

| Hours of Treatment | 4 | 6 | 8 | 16 | 24 | Starting Material |
|---|---|---|---|---|---|---|
| Components Found: | | | | | | |
| 1° $C_7$ percent | 97.5 | 99.1 | 99.0 | 99.4 | 99.7 | 90.9 |
| 2° $C_7$ do | 2.0 | 0.60 | 0.60 | 0.024 | 0.01 | 8.6 |
| 1° $C_5$ do | 0.21 | 0.043 | 0.067 | 0.027 | 0.042 | 0.30 |
| 1° $C_3$ do | 0.18 | 0.21 | 0.19 | 0.22 | 0.19 | 0.18 |

In this case the treated product was washed, first with 30 lbs. of water, then with 30 lbs. of water containing sufficient sulfuric acid to maintain Congo red acidity, and finally with 30 lbs. of water containing 150 g. of potassium sulfate.

*Example 4*

In this treatment 54.7 parts of a crude $C_9$ fluoroalcohol cut, consisting predominantly of 1,1,9-trihydroperfluorononanol was heated with 6 parts of potassium hydroxide dissolved in 30 parts of water for a total of 40 hours at $90\pm2°$ C. The treated product was washed, first with 30 parts of water, then with 30 parts of dilute (about 3%) sulfuric acid, and finally with 30 parts of water. This yielded 47.5 parts of a wet oil layer which solidified. The course of this reaction, and the composition of the analyzed products, including the test portions withdrawn, are shown below:

| Components Found | In Starting Material, percent | Percent After Treatment for Hours | | | | |
|---|---|---|---|---|---|---|
| | | 4 | 16 | 24 | 32 | 40 |
| 1° $C_9$ | 90.5 | 93.5 | 96.1 | 96.7 | 97.0 | 97.5 |
| 2° $C_9$ | 8.2 | 5.1 | 2.6 | 1.9 | 1.4 | 0.93 |
| 1° $C_7$ | 1.2 | 1.3 | 1.3 | 1.3 | 1.4 | 1.4 |
| 2° $C_7$ | 0.86 | 0.07 | 0.06 | 0.04 | 0.03 | 0.01 |

*Example 5*

A crude $C_9$ fluoroalcohol cut from onother production lot was treated in a similar manner, using for 120 parts of this cut, 24 parts of potassium hydroxide dissolved in 120 parts of water, and heating the mixture for a total of 36 hours at temperatures from 90 to 98° C. The crude, treated product was washed, first with 40 parts of water, then with 40 parts of water containing sufficient sulfuric acid to maintain Congo acidity, and finally with 40 parts of neutral water. The washed oil was distilled, collecting the cut boiling at 103–108° C. under 10–15 mm. mercury pressure. The results are indicated below:

| Components Found | In Starting Material, percent | In Final Product, percent |
|---|---|---|
| 1° $C_9$ | 89.9 | 99.3 |
| 2° $C_9$ | 7.7 | None |
| 1° $C_7$ | 2.3 | 0.6 |

*Example 6*

A crude $C_7$ fluoroalcohol cut of the composition shown below was purified by heating 400 parts of it with 55 parts of sodium hydroxide dissolved in 190 parts of water in a rotating bomb for 5 hours at 150° C. under a maximum pressure of 180 p.s.i.g. The cooled reaction product consisted of a two-phase, brown-colored liquid. The separated oil layer was washed with dilute hydrochloric acid (in order to neutralize the remaining excess of sodium hydroxide) and then with water. The oil was then dried over anhydrous $Na_2SO_4$; its weight corresponded to a recovery yield of 95% of the primary fluoroalcohol originally present in the $C_7$ fluoroalcohol cut. The analytical results tabulated below show that this purification treatment was highly successful, although the total reaction time was much shorter and the temperature much higher than employed in the previous examples.

| Components Found | In Starting Material, percent | After Purification, percent |
|---|---|---|
| 1° $C_7$ | 92.9 | 98.9 |
| 2° $C_7$ | 5.9 | 0.2 |
| 1° $C_5$ | 1.0 | 0.5 |
| 1° $C_9$ | 0.2 | 0.4 |

It is understood that any of the heretofore-described primary and secondary fluoroalcohols may be treated according to the preceding representative examples to achieve substantially the same results. Other variations and modifications within the scope of one skilled in the art are contemplated by the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for reducing the bis-(omega-hydroperfluoroalkyl)carbinol content of mixtures of said bis-carbinols and omega-hydroperfluoroalkyl carbinols, said bis-carbinol having the formula

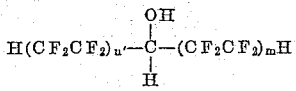

wherein $n'$ and $m$ are integers having a value of from 1 to 5, and said omega-hydroperfluoroalkyl carbinol having the formula $$H(CF_2CF_2)_nCH_2OH$$

wherein $n$ is an integer having a value of from 2 to 10, which process comprises heating said mixtures to within the reaction temperature range of about 80° C. to 160° C. with aqueous caustic alkali taken from the group consisting of sodium hydroxide and potassuim hydroxide, said aqueous caustic alkali having a concentration of from 10 to 30 parts of said alkali in 100 parts of water and being present in the mixture in an amount sufficient to neutralize completely the fluorine ions which would be formed if all the fluorine in the bis-(omega-hydroperfluoroalkyl)carbinol were split off as HF, allowing the reaction mixture to form an aqueous alkali layer and an oily layer which are subsequently separated, and obtaining from the oily layer said omega-hydroperfluoroalkyl carbinol.

2. The process of claim 1 wherein the secondary fluoroalcohol has the formula

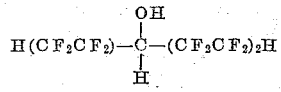

and the primary fluoroalcohol has the formula $$H(CF_2CF_2)_3CH_2OH$$

3. The process of claim 1 wherein said bis-(carbinol) contains nine carbon atoms and said omega-hydroperfluoroalkyl carbinol has the formula $H(CF_2CF_2)_4CH_2OH$.

References Cited in the file of this patent

UNITED STATES PATENTS 2,870,218    Townsend _____ Jan. 20, 1959